UNITED STATES PATENT OFFICE.

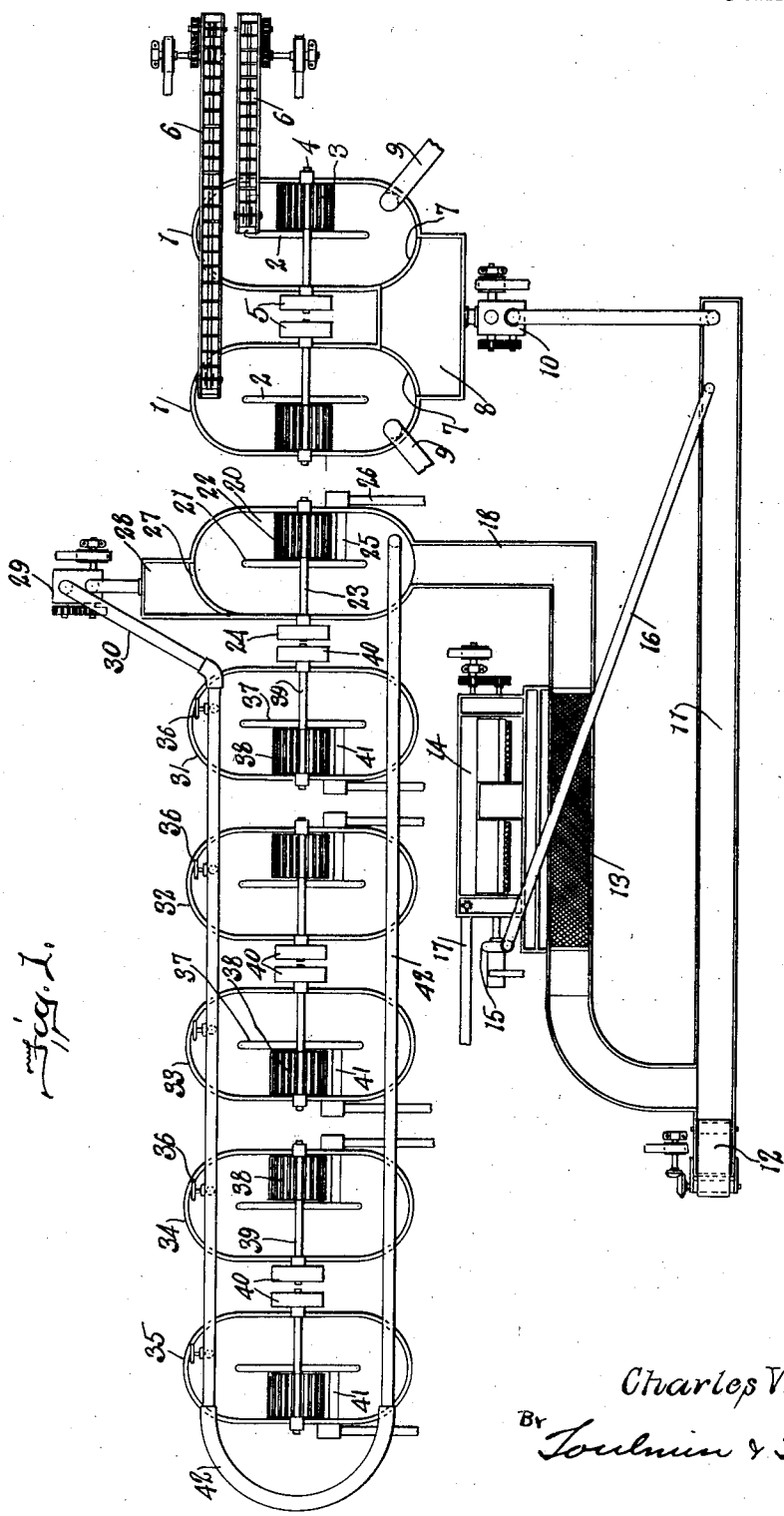

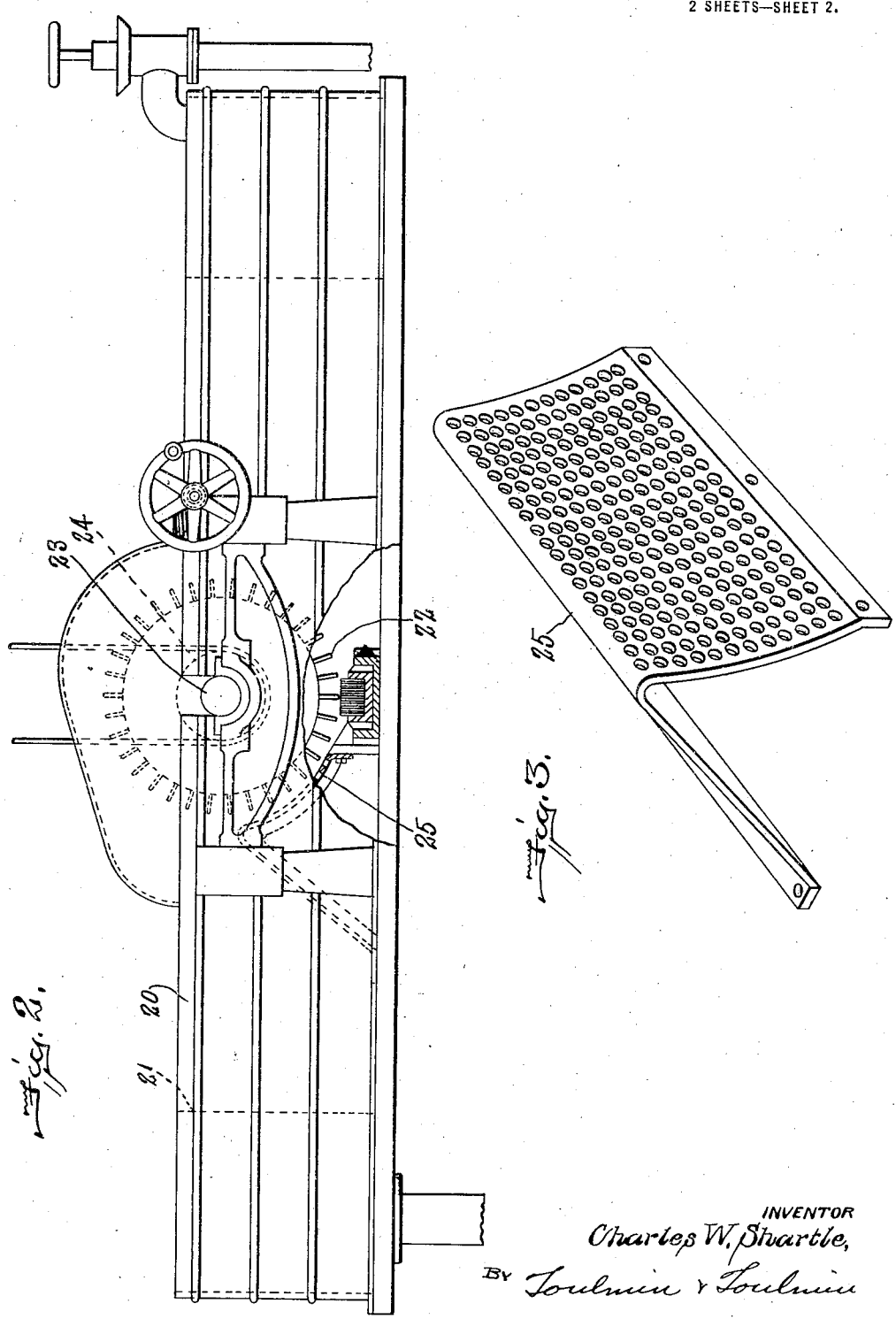

CHARLES W. SHARTLE, OF MIDDLETOWN, OHIO.

APPARATUS FOR MANUFACTURING PULP.

1,405,947.  Specification of Letters Patent.  Patented Feb. 7, 1922.

Application filed July 12, 1920. Serial No. 395,527.

*To all whom it may concern:*

Be it known that I, CHARLES W. SHARTLE, a citizen of the United States, residing at Middletown, in the county of Butler and State of Ohio, have invented certain new and useful Improvements in Apparatus for Manufacturing Pulp, of which the following is a specification, reference being had therein to the accompanying drawings.

My invention relates to pulp making apparatus.

The general object and design of the invention is to provide an apparatus by which a double breaking operation may be effected upon the raw stock, by which settling, screening and thickening devices are provided between the breakers and a succession of beaters, the latter following the screen, all as hereinafter more fully pointed out.

In the accompanying drawings,

Fig. 1 is a plan view of my apparatus in its entirety;

Fig. 2 is a detail view showing one of the breakers or beaters in relation to the fixed blades; and Fig. 3 is a detail perspective view of the backfall.

I have illustrated in the drawings one form of my apparatus, that I prefer. It is composed of a pair of two or more breaking vessels 1, each containing the conventional partition 2 and breaking drum 3, being a cylindrical body armed with coarse breaking knives, the drum being mounted on a shaft 4 rotatable by a belt pulley 5. Raw stock, such as cut rags, is conveyed by conventional chain conveyors 6 to the breakers and there treated to a breaking operation which reduces their size into what is known as coarse stock. Thence this stock with water flows through weirs 7 into a reservoir 8, water is supplied to the breakers through water pipes 9.

The now coarsely reduced material is taken from the reservoir 8 by the stuff pump 10 and delivered into a settling trough 11 along with the water, whereby any foreign matter, such as nails, pieces of iron, particles of rock, etc., may be settled, allowing the floatable material to pass on. Foamy stuff and all particles of floating matter, such as chips or cork, pass over a skimmer 12, while the real stock or rags flow on through to a screen 13 where the sufficiently fine particles pass through to a wet machine 14 of conventional construction, by which water is sufficiently drawn off to leave a thickened product. A pump 15 and its connections draw off the surplus water and by a pipe 16 the water is delivered back into the settling trough 11 for reuse. The thickened product, which is in a finished state, being fine and constituting pulp, is drawn off through a discharge pipe 17. This is the first product produced by this apparatus.

Recurring now to the screen it will be understood that the tailings flow along through a trough 18 connected to the first beater 20. Flowing into this beater this stock is subjected to a beating and reducing action to render it still finer and fine enough to go thence into a succession of beaters, each receiving a separate quantity to convert into the final product as will presently appear. The beater 20 comprises the vessel shown with a partition 21 and a drum 22 having knives somewhat finer and closer together than those used in the breakers. This drum is mounted on a shaft 23 rotated by a pulley 24. In treating the stock in the beater 20 a portion of it will become fine enough for immediate withdrawal. This portion is separated from the remainder by a conventional backfall, indicated at 25, and comprising a perforated wall in the form shown in Fig. 3. The stuff which is fine enough passes through perforations into the space beneath the wall, whence it passes out through a discharge pipe 26. This is a finished quantity of product.

The remainder of the material treated in the beater 20 flows thence past a weir 27 into a reservoir 28, whence by a pump 29 it is delivered through a supply pipe 30 to the several succeeding beaters 31, 32, 33, 34 and 35. This pipe has a controlled opening or valve 36 for each beater. Each beater comprises a tank with its partition 37 and drum with its knives 38 mounted on a shaft 39 and rotated by a belt pulley 40. The construction is the same in the several beaters. Likewise, each has the same type of backfall located at the point 41 and constructed in the manner described with reference to the backfall in the beater 20.

Any material which is not discharged from the supply pipe 30 into one or all of the beaters is conveyed by a return pipe 42 back to the first beater, 20, for retreatment and redelivered to the several succeeding beaters.

It will now be seen that by my improved apparatus I produce from suitable rag stock a number of completed batches of ultimate product or pulp. These batches are all being manufactured at the same time. Each batch receives the same amount and kind of treatment so that they are substantially alike. The first batch is derived from the breakers and intermediate mechanism up to and including the thickener 14, while the succeeding batches are derived each immediately from its own beater.

The apparatus, therefore, is a very effective and efficient one, delivering large quantities of finished product or pulp and subjecting the raw product to such a subdivision and succession of treatments that no material part of it is lost for want of treatment.

Having thus fully described my invention, what I claim as new and desire to secure by Letters Patent, is:—

1. In a pulp making apparatus, the combination, with a plurality of breakers, a settling trough, a screen, and a thickener to produce a finished product and tailings, of a succession of beaters, the first of which is connected to receive said tailings, and means to deliver the stock from the first beater to the successive beaters, each beater having discharge means for the withdrawal of its finished product.

2. In a pump making apparatus, the combination, with a plurality of breakers, a settling trough, a screen, and a thickener, of a succession of beaters each having a backfall for the discharge of its finished product, one of said beaters arranged to receive tailings from the screen, and a pipe adapted to deliver stock from said beater to each of the other beaters.

3. In a pulp making apparatus, the combination, with a pair of breakers, a resorvoir, a stuff pump, a settling trough, a screen and a thickener, of a succession of beaters each having a backfall for the withdrawal of its finished product, one beater being adapted to receive the tailings from said screen, a pump connected with said beater, a supply pipe connected with said pump and having controlled openings each discharging into a beater.

In testimony whereof, I affix my signature.

CHARLES W. SHARTLE.